United States Patent
Robinson et al.

(10) Patent No.: US 9,916,273 B2
(45) Date of Patent: Mar. 13, 2018

(54) SIDEBAND SERIAL CHANNEL FOR PCI EXPRESS PERIPHERAL DEVICES

(71) Applicant: Microsoft Technology Licensing, LLC, Redmond, WA (US)

(72) Inventors: Christopher James Robinson, Bellevue, WA (US); Laura Marie Caulfield, Woodinville, WA (US); Brian Charles Coyne, Seattle, WA (US); Mukesh Cooblal, Redmond, WA (US); Mark Alan Santaniello, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 306 days.

(21) Appl. No.: 14/796,243

(22) Filed: Jul. 10, 2015

(65) Prior Publication Data
US 2017/0010995 A1   Jan. 12, 2017

(51) Int. Cl.
| | | |
|---|---|---|
| *G06F 13/40* | (2006.01) |
| *G06F 13/42* | (2006.01) |
| *G06F 11/36* | (2006.01) |
| *G06F 13/38* | (2006.01) |

(52) U.S. Cl.
CPC ...... *G06F 13/4022* (2013.01); *G06F 11/3648* (2013.01); *G06F 13/385* (2013.01); *G06F 13/4282* (2013.01)

(58) Field of Classification Search
None
See application file for complete search history.

(56) References Cited

U.S. PATENT DOCUMENTS

| | | |
|---|---|---|
| 6,092,219 A | 7/2000 | Porterfield |
| 6,185,732 B1 | 2/2001 | Mann et al. |
| 7,395,454 B1 | 7/2008 | Wohlgemuth et al. |
| 7,437,643 B2 | 10/2008 | Khanna et al. |
| 7,743,197 B2 | 6/2010 | Chavan et al. |
| 7,882,393 B2 | 2/2011 | Grimes et al. |
| 8,112,491 B1 * | 2/2012 | Michels ............... H04L 49/901 709/212 |
| 8,296,469 B2 | 10/2012 | Dunstan et al. |
| 8,843,785 B2 | 9/2014 | Haverkamp et al. |
| 8,923,307 B2 | 12/2014 | Lindsay et al. |
| 2005/0183066 A1 | 8/2005 | Jabori |
| 2007/0208973 A1 | 9/2007 | Wu et al. |
| 2010/0081500 A1 * | 4/2010 | Phillips ................. G07F 17/32 463/29 |

(Continued)

OTHER PUBLICATIONS

International Search Report and Written Opinion for PCT/US2016/041416 dated Sep. 14, 2016.

(Continued)

*Primary Examiner* — Farley Abad
*Assistant Examiner* — Dayton Lewis-Taylor
(74) *Attorney, Agent, or Firm* — Workman Nydegger

(57) ABSTRACT

Obtaining data about a peripheral device deployed in a computing environment. A method includes transmitting a primary data stream across a shared communication channel between the peripheral device and a host hosting the peripheral device. The method further includes transmitting on the shared communication channel, a secondary state information stream of consecutively occurring messages with peripheral device state information.

19 Claims, 6 Drawing Sheets

(56) References Cited

U.S. PATENT DOCUMENTS

2014/0095414 A1  4/2014  Thurston et al.
2014/0236526 A1  8/2014  Frediani et al.

OTHER PUBLICATIONS

"Intel® PRO/1000 PT Dual Port Server Adapte", Published on: Aug. 18, 2011, Available at: http://www.intel.com/content/www/us/en/network-adapters/gigabit-network-adapters/pro-1000-pt-dp.html.
"How to Get a Real Serial Port—PCI Express under Linux", Published on: Mar. 15, 2013, Available at: http://martin-jones.com/2013/03/15/how-to-get-a-real-serial-port-pci-express-under-linux/.
"StarTech Dual Port PCI Express Gigabit Ethernet Network Card Adapter", Retrieved on: Apr. 28, 2015, Available at: http://www.amazon.co.uk/StarTech-Express-Gigabit-Ethernet-Network/dp/B009X6D2MU.
"International Preliminary Report on Patentability Issued in PCT Application No. PCT/US2016/041416", dated Jul. 3, 2017, 7 Pages.

* cited by examiner

SIDEBAND SERIAL CHANNEL FOR PCI EXPRESS PERIPHERAL DEVICES

BACKGROUND

Background and Relevant Art

Computers and computing systems have affected nearly every aspect of modern living. Computers are generally involved in work, recreation, healthcare, transportation, entertainment, household management, etc.

Computing systems are often comprised of various different components coupled together by various interfaces. For example, a host computing system (also referred to herein as a "host") may be coupled to various peripheral devices (such as network interface cards, disk drives, display adapters, etc.), and the peripherals coupled to each other, by various component busses. Modernly, one such bus that is quite common is the PCI Express (PCIe) bus.

Further, many modern computing system hosts are implemented as data center servers where much of the processing power and storage for computing is managed by the data center such that clients with less processing power and storage can connect to the data centers to request computing tasks be performed.

Many PCI Express (PCIe) peripheral devices are included in modern data center server hosts. A typical configuration includes a multitude of server racks with a multitude of different peripheral devices coupled to the server host. Thus, it is difficult to physically identify and access a particular peripheral device in a server host.

Often these peripheral devices have problems which are difficult to debug. Typical symptoms are that the peripheral device simply "vanishes" from the host, or fails all commands. Typically each vendor of peripheral devices implements their own non-standard debug trace functionality to identify problems with peripheral devices. In such cases, the peripheral device has a channel, such as a serial channel, that is separate from the bus connecting the peripheral device to the host. The peripheral device can stream status information to the channel. However, this channel is not connected to the host, so the channel simply has transient data on it waiting to be captured. One rather common method for allowing the capture of the data on the channel is to have a physical serial debug port on the peripheral device coupled to the channel. The serial port is usually routed to an extra header interface on the peripheral device to which a developer can attach a serial cable (such as an RS232 cable or USB cable). Sometimes an engineer may actually have to solder wires of the serial cable to PCB points on the peripheral device to connect to connect the serial cable to the peripheral device. The cable is then connected to an external system different than the host on which the peripheral device is installed. The external system can then monitor debug trace information on the channel of the peripheral device. This configuration is used primarily in a lab environment.

While this might work in a lab environment where only a small number of devices are being evaluated for hardware development purposes, it is unsuitable for large scale deployments, such as those existing in data centers.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a peripheral device configured to provide state information to a host when the peripheral device is installed on the host. The peripheral device includes a shared communication channel interface. The shared communication channel interface is configured to be coupled to a shared communication channel on the host for communicating between the peripheral device and the host. The peripheral device further includes a switch coupled to the shared communication channel interface. The switch is configured switch between a primary data stream and a secondary data stream to selectively send data from the primary data stream and the secondary data stream on the shared communication channel to the host. The peripheral device further includes one or more primary components. A primary data stream transceiver is coupled to the switch and the primary components. The primary data stream transceiver is configured to at least one of send or receive data on the shared communication channel between the primary components of the peripheral device and the host. The peripheral device further includes one or more diagnostic components. A state information stream transceiver is coupled to the switch and the one or more diagnostic components. The state information stream transceiver is configured to receive state information as a stream of consecutively occurring messages with peripheral device state information from the diagnostic components of the peripheral device and to send the state information to the host on the shared communication channel.

Another embodiment illustrated herein includes a method that includes acts for obtaining data about a peripheral device deployed in a computing environment. The method includes transmitting a primary data stream across a shared communication channel between the peripheral device and a host hosting the peripheral device. The method further includes transmitting on the shared communication channel, a secondary state information stream of consecutively occurring messages with peripheral device state information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments herein implement a sideband diagnostic communication channel over a shared communication channel, such as PCIe, which also implements the primary data channel. This could allow peripherals devices to optionally expose a COM port (or other appropriate port) to the host on which they are installed, with state information routed over the shared channel itself instead of a separate diagnostic channel. Thus, for example, serial state information may be routed across PCIe itself along with primary data of the PCIe channel. In particular, the PCIe channel may carry a state information stream along with a disk i/o data stream, a network data stream, or a video data stream (or other appropriate primary data stream depending on the type of PCIe peripheral).

Such embodiments could reduce the amount of expensive external hardware and physical interfaces implemented on a peripheral device as printed circuit board traces dedicated to connecting to the diagnostic channel to the outside world could be eliminated. Headers connected to the traces allowing for connection of a cable could be eliminated. The cable itself could be eliminated. Further, such peripheral devices would not need a separate system to send state information, as the state information could be sent to the host on which the peripheral device is installed.

Further, such embodiments may result in an overall reduction in computing power required when compared to previous systems as less computing resources are used to capture and analyze state information. Further, an enterprise overhead operating cost can be reduced as the system could eliminate the need to have a technician travel to the site of the host system to diagnose individual peripheral devices. Further, personnel costs could be reduced as the technician would no longer need to physically instrument a peripheral device with external hardware, but rather could access the state information electronically in less time and with less effort than was previously required. In particular, a technician may no longer need to physically identify and locate a peripheral device in large datacenter and physically connect cables and other hardware to the device to troubleshoot the device.

Further, in some embodiments, the host system could be improved over previous host systems by configured to automatically evaluate state information for malfunctioning peripheral devices and to automatically perform corrective actions. This could result in servers and other host systems that are cheaper to maintain and have less down time as a result of malfunctioning peripheral devices.

Figure 1:
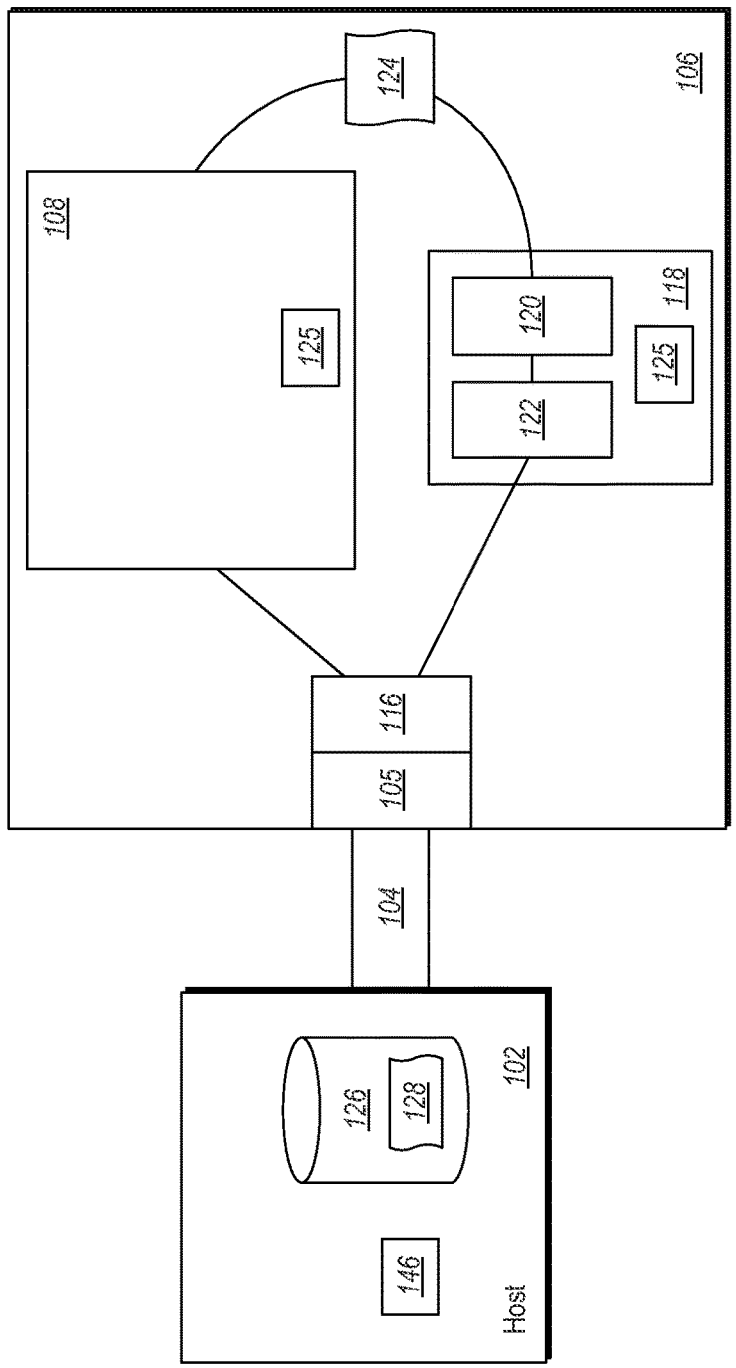
FIG. 1 illustrates a peripheral device installed on a host.

FIG. 1 illustrates a host 102. The host includes a shared communication channel 104. For example, the shared communication channel 104 may be a PCIe bus, SATA bus, SAS bus, SCSI bus, USB, etc. A peripheral device 106 is coupled to the host 102 through the shared communication channel 104 via a shared communication channel interface 105. The peripheral device includes primary components 108. The primary components 108 are one or more of hardware, software, firmware, etc. that are used to implement the primary functionality of the peripheral device 106 (e.g. functionality as a drive, network interface card (NIC), video graphics adapter, field programmable gate array (FPGA), etc.).

Figure 2:
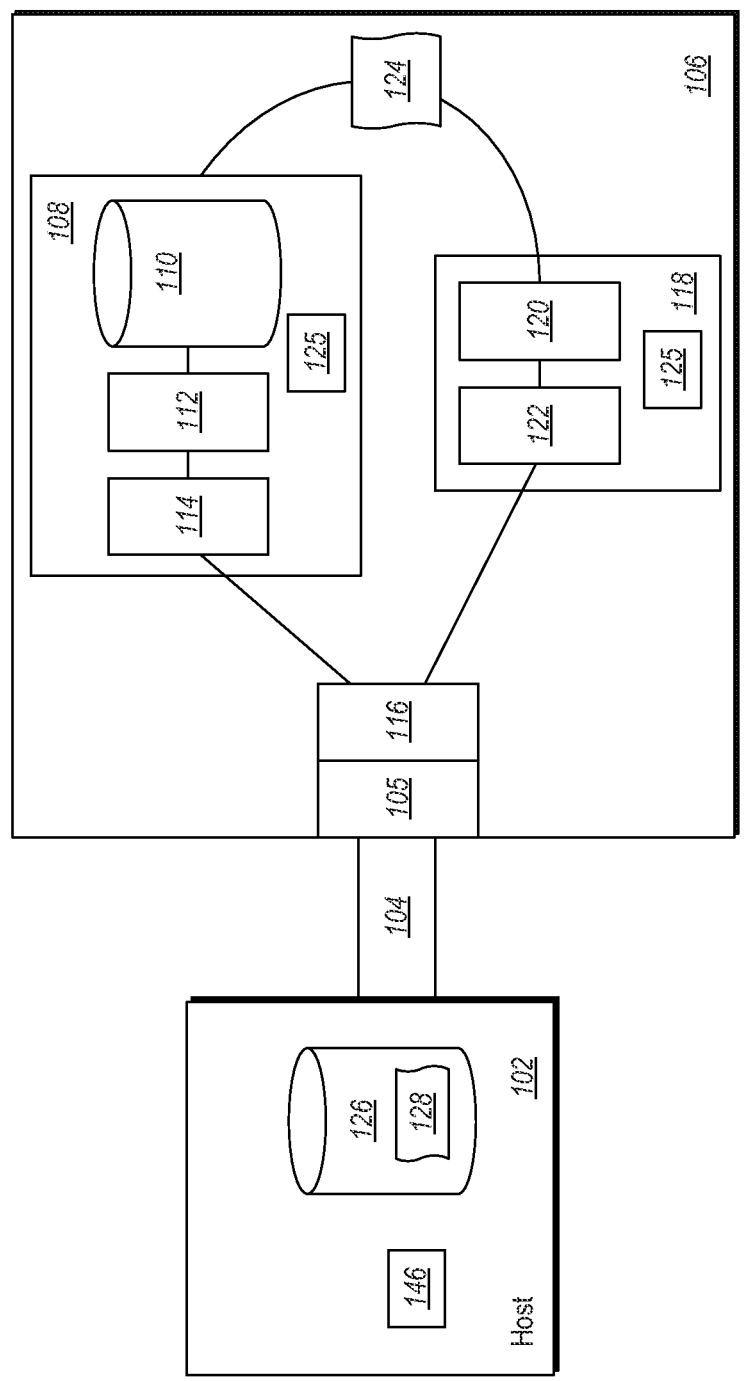
FIG. 2 illustrates an example where the peripheral device is a drive.

Thus, for example, with reference to FIG. 2, if the peripheral device 106 is a drive, such as a solid state drive (SSD) or hard disk drive (HDD), the primary components 108 may include various storage components 110 such as hard disks, magnetic storage, optical storage, NAND/NOR flash memory, DRAM, SRAM, other volatile or non-volatile storage, etc., various interface components 112 to interface with the storage components 110 such as to read and write data to the storage components 110, and various transceiver components 114 to allow the host system 102 to send and receive data from the interface components 112. In this example, the transceiver components 114 may be coupled to, and configured to transmit and receive data on the shared communication channel 104. In the example illustrated, the transceiver components 114 are coupled to a switch 116 that is also coupled to the shared communication channel interface 105 for connection to the shared communication channel 104. When the primary components 108 need to send data to the host 102, they can do so by sending the data through the switch 116, across the shared communication channel 104.

Figure 3:
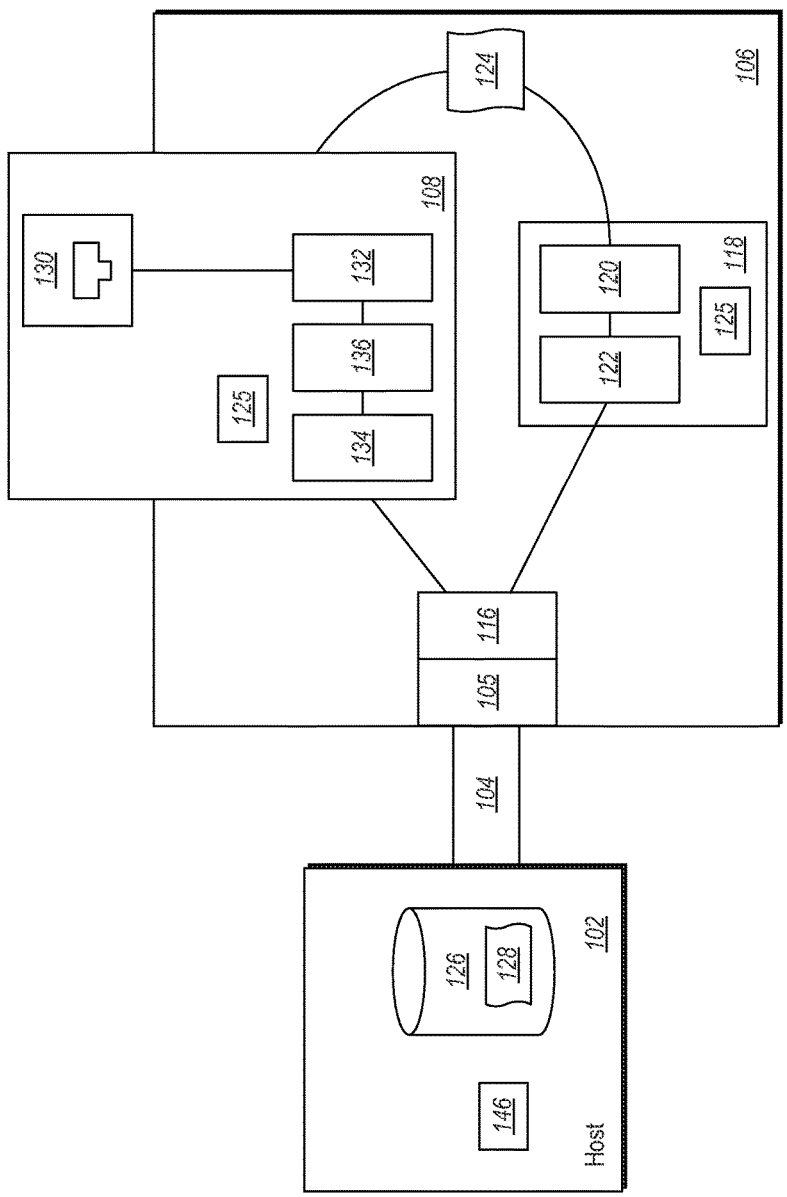
FIG. 3 illustrates an example where the peripheral device is a network interface card.

The peripheral device 106 may alternatively or additionally be other types of devices. For example, FIG. 3 illustrates an example where the peripheral device 106 is a network interface card (NIC). In this case, the primary components 108 include a network connector 130 configured to connect to network cabling. For example, the network connector 130 may be an RJ-45 jack. The primary components 108 may further include an interface 132 configured to send and receive data using the network connector 130. The primary components 108 may further include transceiver components 134. The transceiver components 134 may be configured to send and receive data to and from the host 102. For example, data from a network intended for the host 102 may be received by the peripheral device 106 using the network connector 130 and interface 132. Translation components 136 may operate on the received data to translate the received data to a format appropriate for the host 102. The translated data may then be sent to the host 102 through the transceiver components 134 and the switch 116. The host 102 may also send data intended for another host to the peripheral device 106 through the transceiver components 134 and the switch 116. The transceiver components 134 can provide the data to the translation components 136 where the data can be translated into a format appropriate for sending the data on a network. The translation components can send the translated data to the interface 132, where it can be further provided to the network connector 130 and transmitted on a network to another host on the network.

Figure 4:
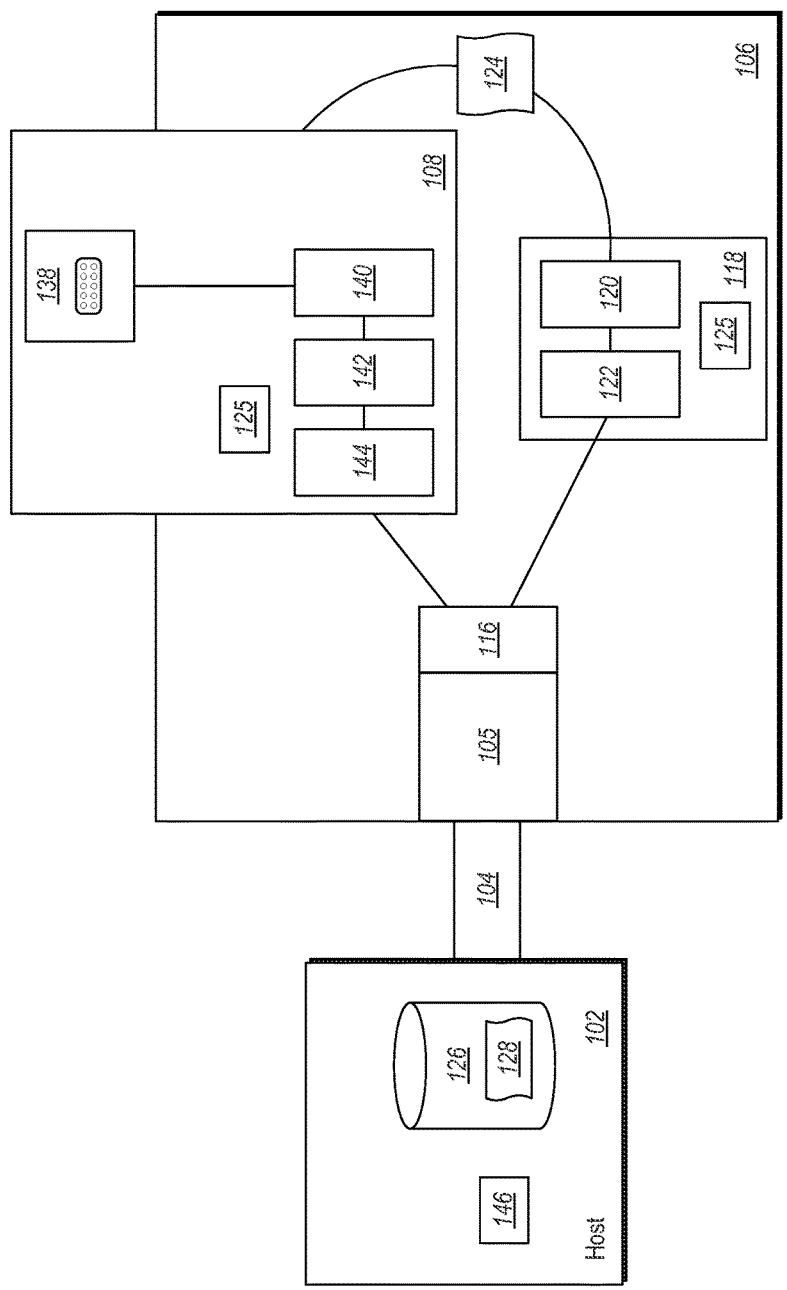
FIG. 4 illustrates an example where the peripheral device is a video graphics adapter.

Referring now to FIG. 4, an example is illustrated where the peripheral device is a video graphics adapter, such as is used to provide video output to a display device. In this case, the primary components 108 include components configured to receive video data from the host 102 and to provide the video data to a display device. For example, the primary components 108 in this case include a video connector 138. The video connector 138 may be a connector such as an HDMI, DVI, VGA, or other connector configured to connect to a display device for sending video data to the display device. The primary components may include video output components 140 coupled to the video connector 138 configured to create signals for an appropriate display device. The primary components further include video data formatting components 142 coupled to the video output components where the video data formatting components 142 are configured to format data into a format appropriate for display on a display device. The primary components 108 in this example, also include transceiver components 144. The transceiver components 144 are configured to receive video data through the switch 116 from the host 102.

Figure 5:
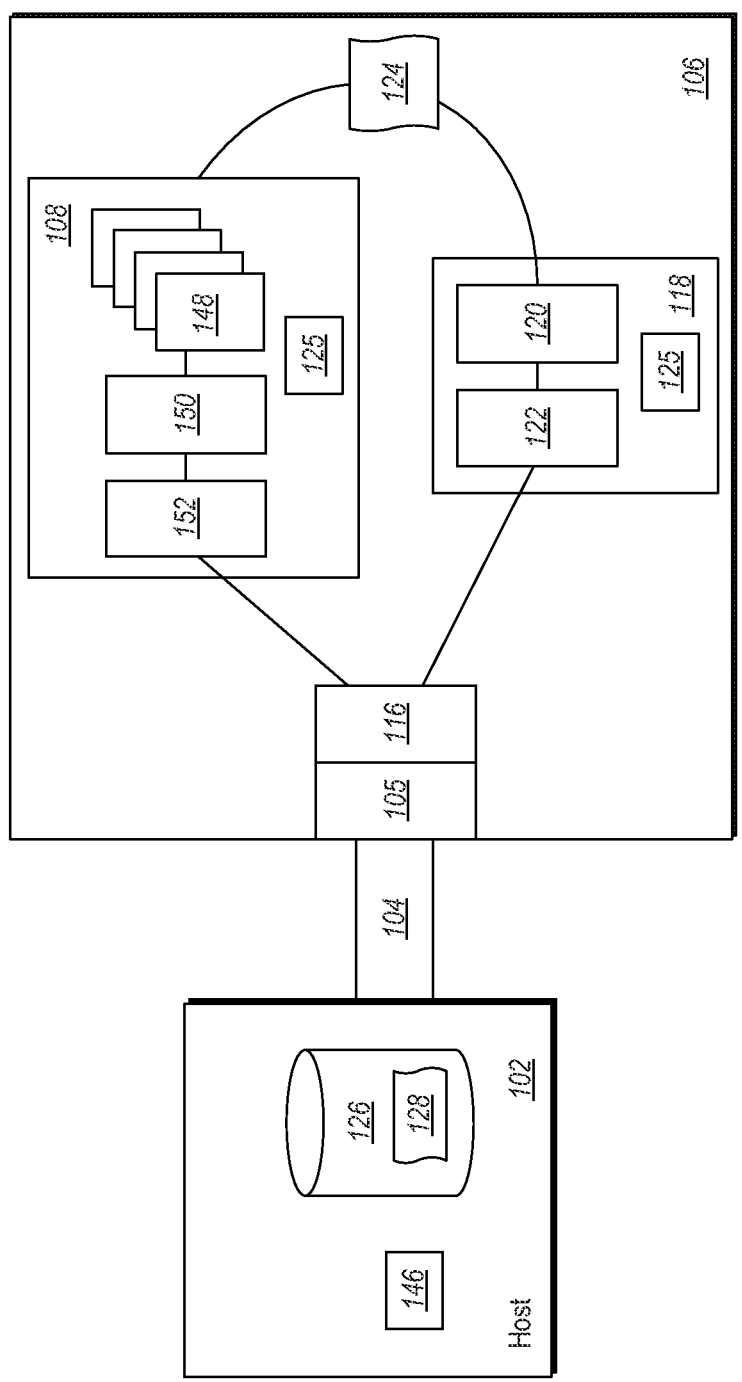
FIG. 5 illustrates an example where the peripheral device is a custom hardware accelerator.

Referring now to FIG. 5, an example is illustrated where the peripheral device 106 is a custom hardware accelerator or coprocessor. In this example, the primary components 108 may include one or more supplemental processor components 148. These processor components 148 can include special purpose processors configured to perform specialized computing tasks in an accelerated way. The primary components further include various interface components 150 to interface with the processor components 148 such as to provide data to and receive data from the processor components 148. The primary components also include various transceiver components 152 to allow the host system 102 to send and receive data from the interface components 150. In this example, the transceiver components 152 may be coupled to, and configured to transmit and receive data on the shared communication channel 104. In the example illustrated, the transceiver components 152 are coupled to a switch 116 that is also coupled to the shared communication channel interface 105 for connection to the shared communication channel 104. When the primary components 108 need to send and receive data to and from the host 102, they can do so by sending the data through the switch 116, across the shared communication channel 104.

Returning once again to FIG. 1, FIG. 1 further illustrates that the peripheral device 106 further includes diagnostic components 118. The diagnostic components 118 represent a separate subsystem of the peripheral device 106. In particular, the diagnostic components 118 may include components that monitor the state of the peripheral device 106. The diagnostic components 118 may include a primary component communication module 120 and an interface communication transceiver 122. The primary component communication module 120 is coupled to the primary components 108. In particular, the primary component communication module 120 may receive state information from the primary components 108.

A variety of different state information may be communicated from the primary components 108 to the primary component communication module 120. Typically, the state information from the primary components 108 will be a stream of consecutively occurring events related to the state of the primary components 108. For example, when the primary components 108, as illustrated in FIG. 1, perform a task of writing data to a storage device 110, a message 124 may be sent to the diagnostic components 118 indicating that data has been written to the storage device 110. The message 124 may include information such as when the write occurred, how much data was written, where the data was written to, successful actions taken by the device's firmware, errors or warnings recognized by the device's firmware, measurements of the hardware collected by the device's firmware (such as temperature of sensitive components, or other hardware signals delivered to the drive's controller), wear of storage media, timestamps indicating when events occurred, periodic statements about current state of the device (e.g., "Buffer X is now 42% full"), announcement of beginning or ending of various phases, announcement of beginning or ending of autonomous processes a device might initiate on its own (e.g., "begin wear-levelling routine."), announcement of error conditions and characterization of such error conditions (e.g., transient or permanent, correctable or uncorrectable; announcement of corrective actions being taken by a device, logging data describing the host activity as observed by the peripheral device 106 over the shared communications channel 104 (e.g., "host sent identify command; host sent device sleep command; etc."), and/or other pertinent information. Similarly, when the primary components 108 send data to the host 102 across the shared channel 104, the message 124 may be sent to the diagnostic components 118 indicating details about sending the data to the host 102. For example, the message 124 may include information identifying when data was sent using the primary components 108, how much data was sent using the primary components, etc.

Additionally, other device state information may be collected by the diagnostic components 118. For example, such other state information may be based on physical conditions of the peripheral device 106. For example, various sensors 125 may be included in the diagnostic components 118 or the primary components 108 which can monitor physical conditions related to the peripheral device 106. One example of such a sensor 125 may be a temperature sensor. Other physical conditions that may be monitored may include one or more of voltage levels, such as those that trigger power loss protection, currents, fan speeds, capacitor health, current draw of a NAND array, physical intrusion sensors, etc.

The primary components communication module 120 sends the information from the message 124 (and any other peripheral device 106 state information) to the interface communication transceiver 122. The interface communication transceiver 122 is coupled to the shared communication channel 104. In particular, as illustrated, the interface communication transceiver 122 is coupled to the switch 116, which is coupled to the shared communication channel 104. As such, the interface communication transceiver 122 can send state information from the primary components 108 (or other state information) through the shared communication channel 104 to the host 102.

The host 102 is configured to handle the state information received from the diagnostic components 118 separate from data received from the primary components 108. For example, the host 102 may include storage 126 and is configured to store the state information received from the diagnostic components 118, while data from the primary components is not stored in the storage 126, but is stored in other storage or handled in other appropriate ways separate from the data from the diagnostic components 118. Typically, the host 102 will simply log the stream of state information 128 from the diagnostic components 118 in the storage 126. In some embodiments, the storage 126 is implemented as a ring buffer such that only a certain amount of state information is maintained with older state information being replaced by new state information over time.

The state information 128 will typically not be analyzed by the host 102 unless and until some interesting event takes place with respect to the peripheral component 106. For example, if the peripheral component 106 malfunctions or is in an error state, then the state information 128 stored in the storage 124 can be analyzed to attempt to determine the state of the peripheral component 106 when the error state occurred, conditions and/or state of the peripheral component 106 leading up to, or that caused malfunction of the peripheral component 106, etc.

In some embodiments, an administrator of the host 102 can access the state information 128 for various diagnostic purposes. For example, the administrator can use the state information 128 to attempt to identify conditions leading up to and causing a failure condition of the peripheral device 106.

Alternatively, the host 102 itself may have a diagnostic module 146 that is able to detect an abnormal event and as a result analyze the state information 128 to attempt to identify causes and potential solutions to a failure condition. For example, in some embodiments, the host 102 diagnostic module 146 may include machine learning capabilities that can help the host 102 to identify causes of failures, and potential solutions that have worked previously when certain error conditions were encountered. This can be based on previous peripheral device state conditions that could be identified by the state information 128. In this way, a host 102 can determine if the host 102 is able to remedy the error condition or if the host 102 needs to notify an administrator that peripheral device needs to be physically repaired or replaced.

For example, the host 102 may be able to remedy the error condition be restating the peripheral device 106, resetting the peripheral device 106, reinitializing the peripheral device 106, reprogramming the peripheral device 106, reinstalling software or firmware for the peripheral device 106, upgrading software or firmware for the peripheral device 106, etc. In some embodiments, the host 102 could simply disable the peripheral device 106. This may be a particularly useful option when there are multiple redundant such devices present in a large system for fault tolerance purposes.

In some embodiments, the host 102 signals the peripheral device 106 to turn on an indicator, such an LED on the peripheral device such that, later, a technician is easily able to identify the device when performing service. This may be particularly useful when multiple devices are present in a larger system.

In some embodiments, the notification to the administrator will automatically include the state information 128. In some embodiments, the host 102 may also log the information so that system administrators can data mine a larger set of data from several different machines. This would allow designers to improve the designs over time based on a large number of samples. Further, embodiments may be implemented where the data is used to accurately rank the priority of bugs to fix.

Thus, the host 102 may include a diagnostic module 146. The diagnostic module 146 may be configured to identify a failure condition of the peripheral device 106 and to use the state information 128 to attempt to identify the cause of the failure device. Alternatively or additionally, the host 102 may include a diagnostic module 146. The diagnostic module 146 may be configured to identify a failure condition of the peripheral device 106 and to use the state information 128 to attempt to remedy the failure condition. In some such embodiments, the diagnostic module 146 may be a machine learning module configured to learn failure condition remedies over time. Alternatively or additionally, the host 102 may include a diagnostic module 146. The diagnostic module 146 may be configured to identify a failure condition of the peripheral device 106 and to use the state information 128 to attempt to send a notification to an administrator of the failure condition including providing the peripheral device secondary state information in the notification.

Secondary state information can be beneficial for testing software drivers that interact with or control the primary components 108. For example, a common functional testing technique is to issue one or more commands to a device via a driver under test and validate whether the command was specified correctly to the device. If the command structure is not formulated correctly by the driver, it can lead to unintended behaviors. Depending on the specific action performed by the command, it can be difficult for a test application to assess whether the command was well-formed. The secondary state information can be used as a feedback loop to the test applications to provide additional detail on commands received by a device.

The embodiments described above may be implemented where there are no extra wires and/or headers for state information on the peripheral device 106. Rather, such data could be transmitted and/or received on the shared communication channel 104 without the need for extra physical cables or cabling hardware.

Embodiments may be implemented where the diagnostic functionality, causing transmission of state information, could be always on. Alternatively, the diagnostic functionality may be selectively enabled. For example, in some embodiments, the diagnostic functionality could be enabled via firmware or a driver setting. When the settings are enabled, the diagnostic components 118 will transmit state information, whereas when the settings are disabled, the state information would not be sent. In this way state information could be selectively captured when deemed appropriate by a system administrator.

Some embodiments selectively allow some diagnostic messages but not others. For example, the peripheral device 106 may have different logging levels. The host 102 could opt in to more-verbose levels of detail for each logging level. For example, level 1 might include only critical errors. Level 2 might include errors and warnings. Level 3 might include errors, warnings, and informational messages. Etc.

Embodiments may be implemented in a number of different fashions. In particular, various configurations of the primary components 108, diagnostic components 118 and switch 116 may be implemented. For example, in some embodiments, the primary components 108, the diagnostic components 118, and the switch 116 may all be implemented as separate and distinct subsystems which are then assembled together during the manufacturing process of the peripheral device 106. In this example, the primary components 108, diagnostic components 118, and switch 116 may be connected through physical cables and printed circuit board traces, or other appropriate connections.

In alternative embodiments, portions of the primary components 108, diagnostic components 118, and switch 116 may be implemented together on the same semiconductor die. In these embodiments, during the semiconductor fabrication process, the various components can be interconnected on the same semiconductor die using semiconductor device interconnection methods.

Logically, the switch 116 could be a 2-port PCIe switch (or other appropriate shared communication channel switch) that exposes a serial adapter (or other appropriate diagnostic channel adapter). Often, this functionality is incorporated into the peripheral device's circuitry, such as in the peripheral device's application specific integrated circuit (ASIC) directly.

In one example embodiment, the peripheral device 106 exposes two endpoints, the main peripheral device itself (SSD, FPGA, Network NIC, etc.) as well as a simple serial COM (or other appropriate form factor) port. As noted above, this feature need not be enabled by default, but could be configured via one or more of software, firmware, drivers, etc.

Thus, instead of the common practice of having a serial header which is simply not connected in production hardware, this serial port would instead loop to the host 102 itself, as if the 2nd PCIe port was connected to a serial adapter.

When production issues are detected, or to enable hardware debug at scale, the extra COM port can be enabled and software at the host 102 can easily log the trace data for later forensic analysis in the event of any problems.

As illustrated above, the peripheral device 106 is configured to provide state information to a host 102 when the peripheral device 106 is installed on the host 102. The peripheral device 102 includes a shared communication channel interface 105. The shared communication channel interface 105 is configured to be coupled to a shared communication channel 104 on the host 102 for installing the peripheral device 106 on the host 102.

The peripheral device 106 further includes a switch 116 coupled to the shared communication channel interface 105. The switch 116 is configured switch between a primary data stream and a secondary data stream to selectively send data from the primary data stream and the secondary data stream on the shared communication channel 104 to the host 102.

The peripheral device 106 further includes a primary data stream transceiver 114, 134 or 144, coupled to switch 116. The primary data stream transceiver 114, 134 or 144 is configured to at least one of send or receive data between primary components 108 of the peripheral device 106 and the host 102.

The peripheral device 106 further includes a state information stream transceiver 122 coupled to switch 116. The state information stream transceiver 122 is configured to receive state information as a stream of consecutively occurring messages with peripheral device state information from diagnostic components 118 of the peripheral device 106 and to send the state information to the host 102.

In some embodiments, as illustrated above, the switch 116, the primary data stream transceiver 114, 134, or 144 and the secondary data stream transceiver 122 are implemented separately as discrete components. The components can then be interconnected using printed circuit board traces, cabling and wiring, etc.

In other embodiments, the switch 116, the primary data stream transceiver 114, 134, or 144 and the secondary data stream transceiver 122 are implemented together on a same integrated circuit. Thus for example, the components may be fabricated together on the same semiconductor die or may be implemented in the same ASIC.

Often, the state information stream is a much lower data rate than the primary data stream. For example, while the primary data stream may be of a high data rate with large amounts of storage, network, video or other data, the state information stream may only be an abbreviated view of actions taken by the peripheral device 106 or conditions present on the peripheral device 106, such as information indicating whether or not primary data transfers were successful or not, what types of primary data transfers occurred, temperature of the peripheral device 106 at a given time, etc.

For example, in some embodiments, the primary data stream transceiver may be configured to provide primary data to the host at a first data rate and the state information stream transceiver is configured to provide state information at a second data rate. In some embodiments, the second data rate may be at least two orders of magnitude less than the first data rate. The transceivers may be selected based on this difference. For example, in some embodiments, wherein the primary data stream transceiver 114, 134, or 144 is of a type selected from the group consisting of AHCI, NVMe, SATA Express, SCSI over PCIe, DVI, HDMI, Display Port, Ethernet, proprietary PCIe protocols, etc., and the secondary data stream transceiver is of a type selected from the group consisting of RS232, USB, UART, etc.

Thus, for example, the primary components may have the ability to provide primary data to the host at a data rate of about 3 Gbits/s or greater. In contrast, the diagnostic components may be limited to providing state information at a data rate of 12 Mbits/s or less when USB 1.1 is used, 480 Mbits/s or less when USB 2.0 is used, 1.5 Mbits/s or less when RS232 is used or various other limits such as 128 Kbits/s, 56 Kbits/s, etc.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
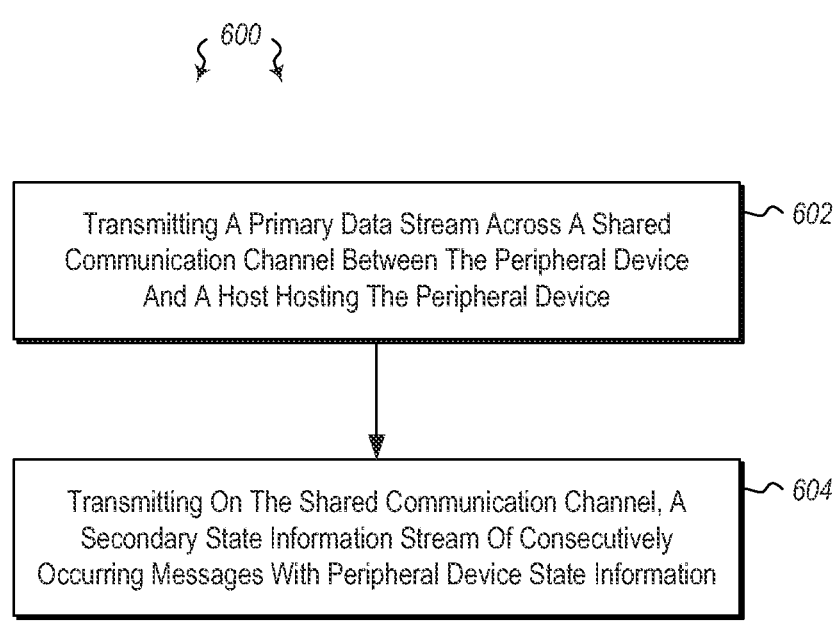
FIG. 6 illustrates a method of obtaining data about a peripheral device deployed in a computing environment.

Referring now to FIG. 6, a method 600 is illustrated. The method 600 may be practiced in a computing environment and includes acts for obtaining data about a peripheral device deployed in the computing environment. The method includes transmitting a primary data stream across a shared communication channel between the peripheral device and a host hosting the peripheral device (act 602).

The method 600 further includes transmitting on the shared communication channel, a secondary state information stream of consecutively occurring messages with peripheral device state information (act 604). Notably, this functionality of streaming device state information may be turned on by default such that the peripheral streams diagnostic data as an automatic device function. Alternatively, the functionality may be turned on by a firmware, software, or hardware setting. In some such embodiments, once turned on, there is no need for further interaction to maintain streaming state information until it is desirable to turn of streaming state information. Thus, embodiments do not require user interaction for each consecutive message in the device state information. Rather, the messages are streamed without user intervention once streaming has been enabled and until streaming has been disabled.

The method 600 may be practiced where the primary data stream is sent or received using a first protocol and the secondary data stream is sent or received using a second protocol. For example, the method 600 may be practiced where the first protocol is high speed protocol selected from the group consisting of AHCI, NVMe, SATA Express, SCSI over PCIe, DVI, HDMI, Display Port, Ethernet, etc., and the second protocol is a low speed protocol selected from the group consisting of RS232, USB, UART, etc.

As noted above, the method 600 may be practiced where transmitting the secondary state information stream is performed selectively in that a user selects particular setting to enable transmitting secondary state information stream.

The method 600 may be practiced where transmitting on the shared communication channel, a secondary state information stream of consecutively occurring messages comprises transmitting a time ordered stream of consecutively occurring messages. Thus, for example, in some embodiments state information messages may be transmitted in a time order based on when state information was generated at the peripheral device. In other embodiments, the state information could be grouped and transmitted by type of information, information related to a particular peripheral device action, or by some other grouping.

The method 600 may be practiced where transmitting a primary data stream across a shared communication channel between the peripheral device and a host hosting the peripheral device includes transmitting a data stream with a data rate of about 3 Gbits/s or greater and transmitting on the shared communication channel, a secondary state information stream of consecutively occurring messages comprises transmitting a data stream with a data rate of about 480 Mbits/s or less.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage peripheral devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic peripheral devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing peripheral device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held peripheral devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage peripheral devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Peripheral devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A peripheral device configured to provide state information to a host when the peripheral device is installed on the host, the peripheral device comprising:
   a shared communication channel interface, wherein the shared communication channel interface is configured to be coupled to a shared communication channel on the host for communicating between the peripheral device and the host;
   a switch coupled to the shared communication channel interface, wherein the switch is configured switch between a primary data stream and a secondary data stream to selectively send data from the primary data stream and the secondary data stream on the shared communication channel to the host;
   one or more primary components;

a primary data stream transceiver coupled to the switch and the primary components, wherein the primary data stream transceiver is configured to at least one of send or receive data on the shared communication channel between the primary components of the peripheral device and the host;

one or more diagnostic components; and a state information stream transceiver coupled to the switch and the one or more diagnostic components, wherein the state information stream transceiver is configured to receive state information as a stream of consecutively occurring messages with peripheral device state information from the diagnostic components of the peripheral device and to send the state information to the host on the shared communication channel, wherein the primary components are configured to provide primary data to the host at a first data rate and where the diagnostic components are configured to provide state information at a second data rate, and wherein the second data rate is slower than the first data rate.

2. The peripheral device of claim 1, wherein the switch, the primary data stream transceiver and the secondary data stream transceiver are implemented separately as discrete components.

3. The peripheral device of claim 1, wherein the switch, the primary data stream transceiver and the secondary data stream transceiver are implemented together on a same integrated circuit.

4. The peripheral device of claim 1, wherein the second data rate is at least two orders of magnitude less than the first data rate.

5. The peripheral device of claim 1, wherein the primary components are configured to provide primary data to the host at a data rate of about 3 Gbits/s or greater and where the diagnostic components are configured to provide state information at a data rate of about 480 Mbits/s or less.

6. The peripheral device of claim 1, wherein the primary data stream transceiver is of a type selected from the group consisting of AHCI, NVMe, SATA Express, SCSI over PCIe, DVI, HDMI, Display Port, and Ethernet and the secondary data stream transceiver is of a type selected from the group consisting of RS232, USB, and UART.

7. The peripheral device of claim 1, wherein the shared communication channel interface is a PCI-e communication channel interface.

8. A method of obtaining data about a peripheral device deployed in a computing environment, the method comprising:

transmitting a primary data stream across a shared communication channel between the peripheral device and a host hosting the peripheral device; and transmitting on the shared communication channel, a secondary state information stream of consecutively occurring messages with peripheral device state information, wherein transmitting the secondary state information stream is performed selectively in that a user selects particular setting to enable transmitting the secondary state information stream.

9. The method of claim 8, wherein the primary data stream is sent or received using a first protocol and the secondary data stream is sent or received using a second protocol.

10. The method of claim 9, wherein the first protocol is a high speed protocol selected from the group consisting of AHCI, NVMe, SATA Express, SCSI over PCIe, DVI, HDMI, Display Port and Ethernet, and the second protocol is a low speed protocol selected from the group consisting of RS232, USB, and UART.

11. The method of claim 8, wherein transmitting on the shared communication channel, a secondary state information stream of consecutively occurring messages comprises transmitting a time ordered stream of consecutively occurring messages.

12. The method of claim 8, wherein transmitting a primary data stream across a shared communication channel between the peripheral device and a host hosting the peripheral device and transmitting on the shared communication channel, a secondary state information stream of consecutively occurring messages comprises transmitting a primary data to the host at a first data rate and transmitting state information at a second data rate, and wherein the second data rate is at least two orders of magnitude less than the first data rate.

13. The method of claim 8, wherein:

transmitting a primary data stream across a shared communication channel between the peripheral device and a host hosting the peripheral device comprises transmitting a data stream with a data rate of about 3 Gbits/s or greater; and transmitting on the shared communication channel, a secondary state information stream of consecutively occurring messages comprises transmitting a data stream with a data rate of about 480 Mbits/s or less.

14. A host system, the host system comprising:

a shared communication channel configured to be coupled to a peripheral device and to receive a primary data stream across the shared communication channel from the peripheral device and to receive a secondary state information stream of consecutively occurring messages with peripheral device state information across the shared communication channel from the peripheral device;

a storage device configured to log the stream of consecutively occurring messages with peripheral device secondary state information separate from data from the primary data stream; and a diagnostic module, wherein the diagnostic module is configured to identify a failure condition of the peripheral device and to use the peripheral device secondary state information to attempt to at least one of (a) identify the cause of the failure device or (b) attempt to remedy the failure condition.

15. The host system of claim 14, wherein the storage device comprises a ring buffer for logging a limited amount of the peripheral device secondary state information.

16. The host system of claim 14, wherein the diagnostic module comprises a machine learning module configured to learn failure condition remedies over time.

17. The host system of claim 14, further comprising a diagnostic module, wherein the diagnostic module is configured to identify a failure condition of the peripheral device and to send a notification to an administrator of the failure condition including providing the peripheral device secondary state information in the notification.

18. The host system of claim 14, wherein the host uses the diagnostic module to identify the cause of the failure device.

19. The host system of claim 14, wherein the host uses the diagnostic module to attempt to remedy the failure condition.

* * * * *